May 3, 1949.  A. J. TOTI ET AL  2,469,345
AUTOMATIC FOWL PICKER

Filed April 30, 1945  2 Sheets-Sheet 1

INVENTOR.
ANDREW J. TOTI
PETER PRINCEVALLE
BY
ATTORNEY

May 3, 1949. A. J. TOTI ET AL 2,469,345
AUTOMATIC FOWL PICKER
Filed April 30, 1945 2 Sheets-Sheet 2
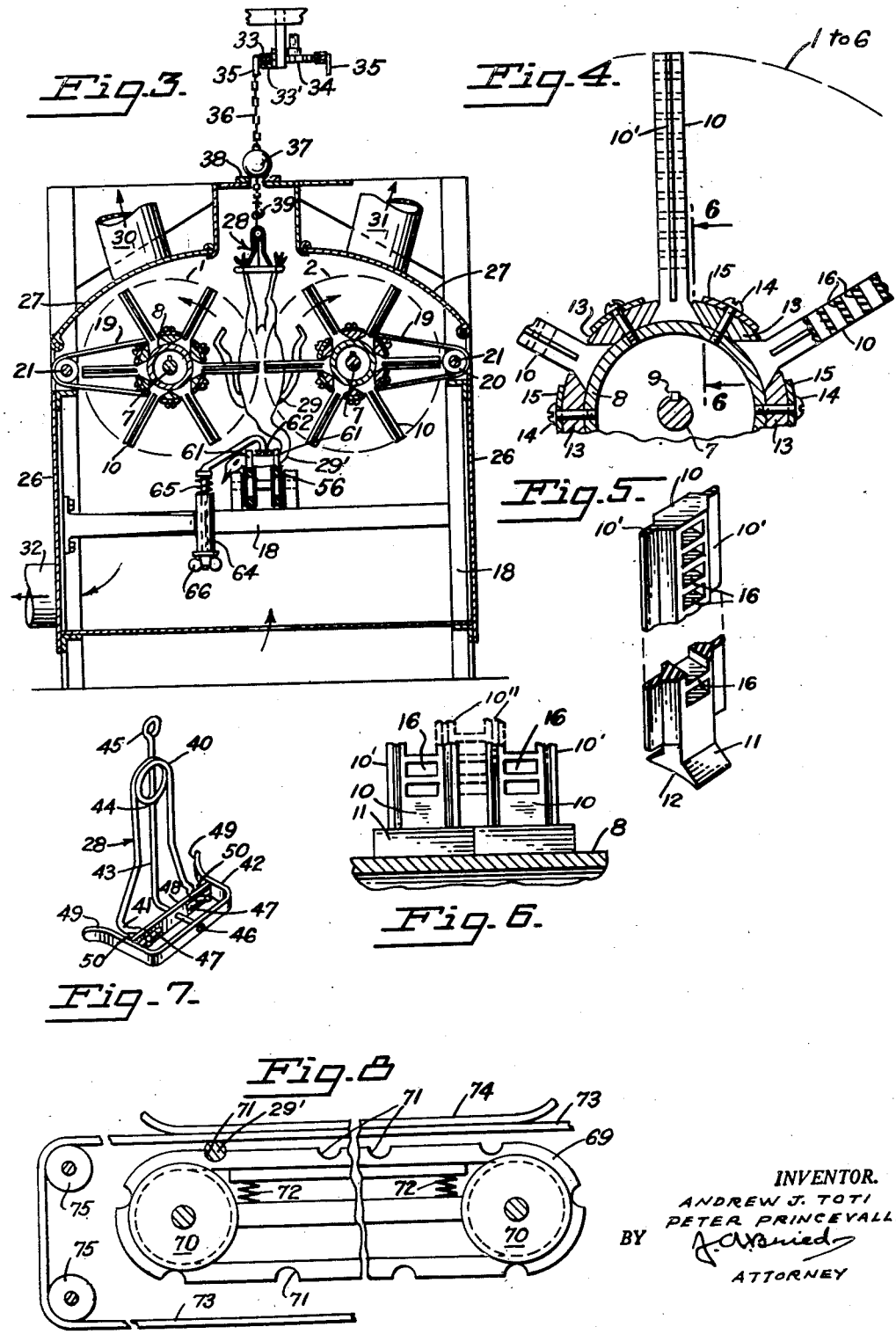
INVENTOR.
ANDREW J. TOTI
PETER PRINCEVALLE
BY
ATTORNEY Patented May 3, 1949

2,469,345

UNITED STATES PATENT OFFICE 2,469,345

AUTOMATIC FOWL PICKER

Andrew J. Toti and Peter Princevalle,
Modesto, Calif.

Application April 30, 1945, Serial No. 590,992

16 Claims. (Cl. 17—11.1)

1

This invention relates to apparatus for plucking the feathers from fowl, particularly chickens, in preparing them for market, and the principal object of the invention is to provide a machine or apparatus into and through which the fowl to be plucked or picked is mechanically conveyed and manipulated by moving picking elements for removal of the feathers, so that as the fowl emerges from the apparatus it will be substantially finished insofar as denuding it from feathers is concerned.

Special features and advantages of the invention will appear in the following description and in the accompanying drawings.

In the drawings—

Fig. 3 is a left end sectional view of the apparatus taken along the line 3—3 of Fig. 1, but with the driving motor and transmission belts and pulleys omitted for clarity.

Fig. 4 is an enlarged cross section of portion of one of the picker drums.

Fig. 5 is an enlarged perspective view of one of the soft rubber picking fingers.

Fig. 6 is a longitudinal section of a portion of a picker drum as seen from the line 6—6 of Fig. 4.

Fig. 7 is a perspective view of one of the fowl suspending leg clamps.

Fig. 8 is a detail showing a variation in the construction of the fowl neck clamping means.

Figure 1:
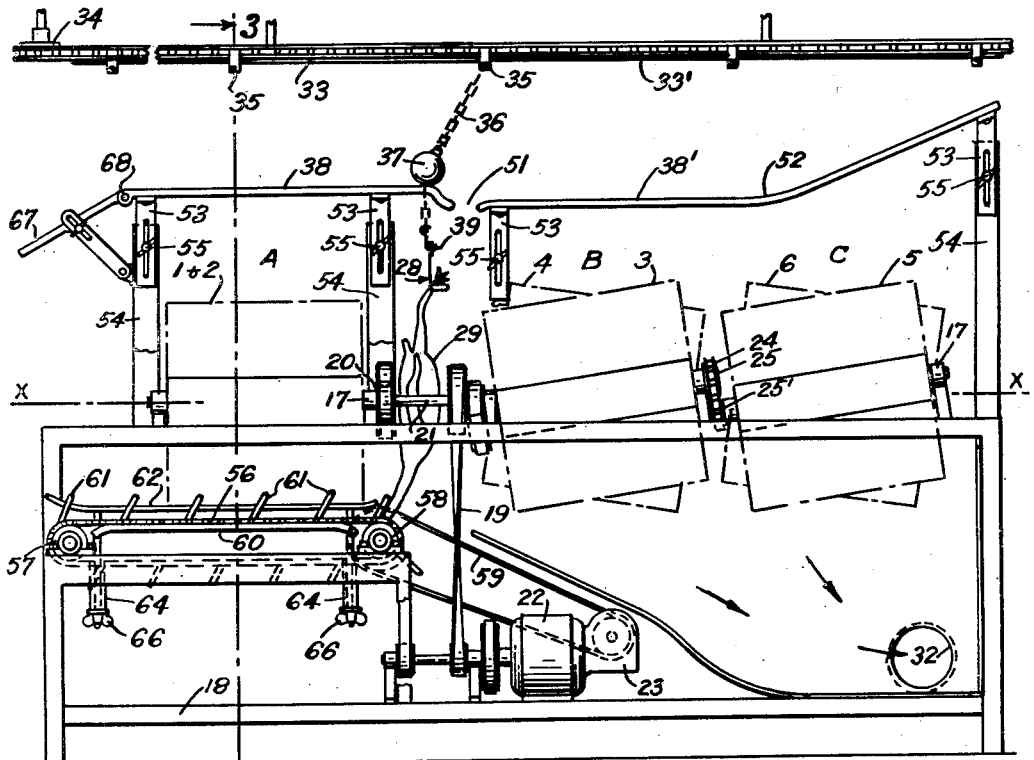
Fig. 1 is a side elevation of an automatic fowl picker made in accordance with the invention with the cover or casing of the apparatus omitted.

Before describing the drawings in detail a general description of the apparatus will be given so that the detailed construction will be more readily grasped.

The apparatus comprises several pairs of revolving picker "drums" each of which consists of a revolvably mounted hub with flexible fingers projecting radially from the hub like a coarse cylindrical brush. These cylinders operate in pairs with the fingers of the two adjacent drums coming quite close, and between which drums the chickens or other fowl to be plucked are passed in single file by a conveyor while the flexible revolving fingers of the drums drag over the entire surface of the chickens to pull out the feathers.

In the apparatus of the drawing three sets or pairs of the drums are used, and between which the chickens are successively carried by the conveyor. The first pair of drums A are arranged in horizontal parallel relation and with the picking fingers revolving upward over the chicken

2 which is suspended by its feet from an overhead conveyor and with the head of the chicken held down by a lower conveyor below the drums.

The other two pairs of drums B and C are not arranged parallel but both have their adjacent drums set askew with relation to a horizontal centerline so that as the suspended chickens are passed through between them by the conveyor the chickens are slowly revolved by the action of the picking fingers.

Both pairs of askew drums revolve in opposite direction to drums A so that the fingers pass downwardly over the chickens instead of upwardly.

At the last pair of drums C the conveyor which carries the chickens along makes an abrupt ascent so as to draw the chicken up through the drums and out, and thereby finish the neck of the bird as well as any portions of the wings which may have been missed.

Figure 2:
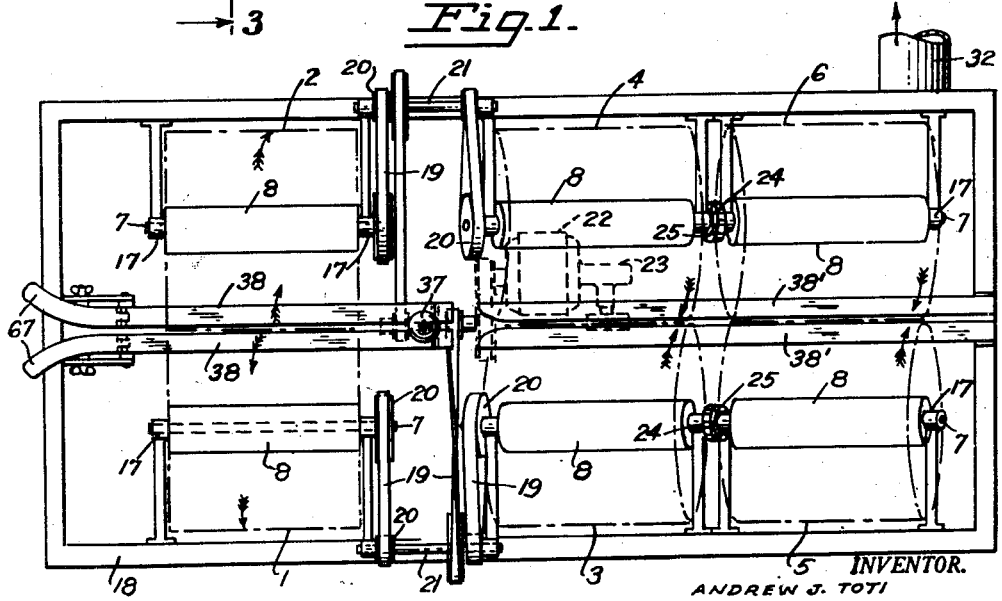
Fig. 2 is a plan view of the apparatus of Fig. 1.

As the picking fingers of the drums are shown in Fig. 3 on the first set A of the drums, and are shown in full detail in Figs. 4 and 5, they have been omitted from Figs. 1 and 2 where they would confuse the showing, so the cylindrical area of the drum fingers are represented by dotted lines, which clearly show the parallel relation of the first drums A and the askew relation of the drums B and C.

In the drawings the outer diameters or cylindrical paths of the two drums A are designated 1 and 2 respectively, of drums B 3 and 4, and of drums C, 5 and 6, so that the various "drums" may hereafter be referred to by these numerals.

Each of the drums comprises, as shown in detail in Figs. 4 to 6, a supporting shaft 7, a hub or body 8 secured to the shaft as at 9, and which hub is provided with several rows of radially extending picking fingers 10.

Picking fingers 10 are of any soft, flexible, resilient material of the general nature of rubber, preferably the latter, and each has an outwardly flaring base 11 curved at its underside 12 to fit firmly against the exterior of hub 8 in abutting relation (at the base) with adjacent fingers in the row and all clamped to the hub as by removable wedge blocks or strips 13 formed with edges to match the flaring bases of the fingers, and held in place by screws 14 passing through washer plates 15 placed against the outsides of wedge strips 13.

The fingers in adjacent rows are preferably staggered as indicated by one of the fingers 10" of the next row in Fig. 6 so that in operation no part of the surface of the fowl or chicken to be picked will be missed. The form of the fingers is important and is here shown as being in cross section a flat sided body 10 with opposite side edges 10' reduced to about one-quarter the body thickness in the form of a pair of flexible fins presented flat-wise to the path of rotation, and the body portion provided with a row of sharp cornered oblong perforations 16 spaced one above the other forming a ladder-like structure as best shown in Fig. 5.

The various "drums" are rotatably supported on their shafts by suitable bearings 17 in turn supported on the frame 18 of the machine or apparatus, and the drums are rotated in the directions above explained and as indicated in the drawings by arrows by suitable transmission here indicated as belts 19 and pulleys 20 and countershafts 21, the belts being crossed where necessary to secure the desired rotation, and all driven by any prime mover, here illustrated as an electric motor 22 fitted with any suitable type of reduction gear 23. Since one each of both pairs of drums B and C run in the same direction and their shafts 7 are adjacent, they may conveniently be coupled as by short endless chains 24 passing over sprockets 25, 25' secured to the adjacent ends respectively of the drum shafts.

In considering the arrangement of picking drums as shown in plan in Fig. 2 the six drums are arranged parallel to a vertical central plane, but as viewed in elevation in Fig. 1 drums 1 and 2 of pair A are parallel to each other and to a centerline $x$—$x$, while drums 3 and 5 are tilted upwardly at their right ends and downwardly at their left ends each about a central point on the center line $x$—$x$, and drum 4 and 6 are tilted in the opposite direction. Also to be considered, is that there is a space about a half a drum's length between drums A and drums B, and a lesser distance between drums B and C.

Surrounding and enclosing or partially enclosing the apparatus is casing 26 and cover sections 27 spaced at their adjacent edges to provide a slot along which the chicken suspending clamps 28 travel in suspending the chickens 29 as they are carried along between the opposed picking fingers of the various drums for removal of the feathers, while suitable pipes, 30, 31 and 32 connected to exhaust apparatus (not shown) remove all the feathers as soon as they are freed from the fowl.

As stated the chickens are passed along between the drums in single file suspended by their feet from an overhead conveyor, and during passage between drums A the heads of the fowl are held down by a lower conveyor so that the upward movement of the picker fingers of the drums A will not throw the fowl out.

The overhead conveyor is here shown as a horizontally extending endless chain 33 running over suitable sprockets, as at 34, at both ends, and suitably supported as by a track 33' so it will not sag, and provided with attachment links 35 at intervals from which the chicken suspending devices depend, but only one of which is shown in the drawings.

The chicken suspending devices each include a short section of chain 36 connected at its upper end to one of the attachment links and at its lower end to a ball or wheel 37 which rolls or drags along a pair of spaced tracks 38 between which a swivel hook 39 from the ball extends and from which hook the chicken foot clamp is suspended. This foot clamp comprises a stiff wire spring preferably formed with a coil 40 at its upper end and with two spring legs 28 extending downward and bent substantially at right angles at 41 to extend laterally into a guiding frame 42 suspended on a central rod 43 which passes upward above the spring coil 40 and is preferably welded or otherwise secured to the coil at one place as at 44, and formed at its extreme upper end with an eye 45 which engages over the hook 39 of the ball 37. The lower end of rod 43 is welded to the frame 42 as at 46, and slots 47 in a brace member 48 serve as guides to permit the spring arms 28 to be compressed or spring outwardly to the limit prescribed by the frame. The outer ends of the frame are flared outwardly as at 49 to provide for entry of the ankles of a chicken's legs close to the feet between the spring and the frame, and the spring arms are bent to provide a socket 50 for each angle, all so that a chicken's feet may be easily pushed into place and the chicken will be suspended as indicated at 29 in Fig. 1, and of course may easily be released after defeathering by simply squeezing the spring arms 28 together, or if desired the clamp may be lifted from the ball hook 39 with the chicken, and may similarly be originally placed on the conveyor, or engaged with the clamp after the clamp has been engaged with the ball hook, or left there.

Track 38 is made in two sections, the rearward section 38' being preferably spaced to leave a gap 51 between it and the forward section 38 so that as the chicken 29 leaves the first pair of drums A and as the conveyor advances with tension on the suspending chain 36, the chicken will swing quickly with some momentum to enter between the second pair of drums B, and the rearward section of track 38' is bent at 52 to extend upward after the chicken has entered between the third pair C of drums for the purpose previously explained. Also, since it is necessary to have the bodies of chickens, ducks, geese, or other fowl fairly centered between the drums, the fowl are first roughly graded into about three sizes, and the tracks are adjusted to proper height for each size by means of slotted track supporting brackets 53 clamped against frame posts 54 and held in place as by hand screws 55.

The means for holding the head of the fowl down while passing between the upwardly running picker fingers of the first pair of drums may take various forms but is shown in Figs. 1 and 3 as an endless chain 56 running over sprockets 57, 58 and driven as by a belt or chain 59 from the reduction gear of the motor 22. The upper run of the chain 56 is supported by a plate 60 and at spaced intervals the links are provided with laterally spaced pairs of forwardly slanted fingers 61 which move along at opposite sides of a shoe or bar 62 and which bar is supported against movement with the chain by means of an offset rod 63 adjacent both ends and which rods are bent downward at their outer ends to slidably fit in brackets 64 and are resiliently urged downwards by springs 65 surrounding the rods and the tension of which springs may be adjusted by wing nuts 66. Thus the bar 62 is resiliently urged toward the conveyor chain to hold a chicken's neck 29' down against the conveyor just in front of a pair of the slanted fingers 61, and the neck will be released automatically when it comes to the end of the shoe or bar 62 as in Fig. 1. The neck of each fowl is engaged with the head holding conveyor manually after the bird had been suspended in the foot clamp 28 from ball hook 39 either by the same operative or by another. In continuous work one boy would place the chickens one after another in the foot clamps, and another boy would engage their necks just back of the heads with the head holding conveyor.

To facilitate the engagement of the balls or rollers 37 over the ends of the tracks 38 the extreme ends are preferably flared apart as indicated at 67 and hinged as at 68 to adjust to the best downward angle to guide the ball 37 up onto the tracks as the ball comes along—it being understood that there are many of these suspension chains 36 depending from the conveyor in spaced relation and on each one of which a chicken or other fowl is suspended. Also to be noted is that chains 36 may be of various lengths and the proper length as well as elevation of tracks 38 is selected to suit the average lengths of the particular batch of fowl being put through the apparatus.

In Fig. 8 is shown a modified form of head clamping conveyor and in which the chain 56 of Fig. 1 is replaced by a thick soft rubber belt 69 passing over grooved pulleys 70 and the belt is provided with half-round sockets 71 to receive the chicken's neck and which belt is resiliently pressed upward by springs 72 against another belt 73 supported against a fixed slide 74 so as to hold a chicken's neck (29') in one of the sockets 71 while the bird is being carried between drums A. The head conveyor may be driven as indicated in Fig. 1 or it may be set in motion by the chickens being carried along by the overhead conveyor 33.

Conveyor 33 is driven by any suitable power drive not shown, either from motor 22 or any other source of power.

If the lower conveyor design of Fig. 8 is used a fixed slide 74 may be supported as shown for the bar 62 of Fig. 3, and belt 73 may have its guide pulleys 75 similarly supported on offset supports, or belt 73 may be entirely omitted.

In operation of the apparatus a satisfactory speed of travel of the fingers has been found to be between 1000 to 3000 feet per minute.

In considering the construction of our automatic fowl picker as above it will be noted that the fowl are first passed between flexible moving picking fingers which pass over all sides of the fowl's body from the neck towards the legs while the fowl is held stretched from both ends, and following which the next set of fingers pass in the opposite direction over the body of the fowl while the askew setting of the finger drums causes the bird to revolve slowly during the picking action, and in the last set of fingers the bird is also slowly revolved while it progresses along between the fingers of the drums and is additionally gradually lifted or moved longitudinally of its body and outward from the picking fingers, all so that every portion of the body and both sides of the wings, and neck are exposed to the action of the fingers, and the speed of the machine is such that one passage of the fowl through it completely denudes the fowl of its feathers.

In actual operation it is commonly the practice to first pass the fowl through steam to make the feathers come away easier.

In view of what has been disclosed, it is manifest that while we show and prefer an arrangement of picking elements with the fowl hanging from above this is not necessarily so, as the whole apparatus could be turned on its side and the fowl fed through it in horizontal position, if desired, or the various drums need not necessarily be in a horizontal row but obviously could be in a vertical row, also instead of turning the fowl about by the use of drums set askew, any other desired means for turning the fowl while being subjected to the defeathering process may be used, and while we show the tracks 38 bent upward at 52 to lift or move the fowl longitudinally in the last set of picking fingers 5, 6, it is obvious that other ways of so moving the fowl may be used if desired.

Having thus described our improved apparatus for automatically defeathering fowl, what we claim is:

1. Fowl picking apparatus comprising a set of flexible picker fingers movable in one general direction against the body of a fowl placed within their path, a second set of flexible picker fingers movable generally in the opposite direction, means for so moving the two sets of picker fingers, and mechanical conveyor means for moving said body successively through the paths of both sets of flexible picker fingers, without requiring removal of the fowl from said mechanical conveyor means.

2. Fowl picking apparatus comprising a set of flexible picker fingers movable in one general direction longitudinally of and against the body of a fowl placed within their path, a second set of flexible picker fingers movable generally in the opposite direction, means for so moving the two sets of picker fingers, and mechanical conveyor means for moving said body successively through the paths of both sets of flexible picker fingers, and a third set of flexible picker fingers moved in the same direction as the second set, and into the path of which third set said body is moved by said mechanical conveyor means, and means for also moving the body at an angle to its direction of movement into the path of the third set of fingers while on said mechanical conveyor means.

3. Fowl picking apparatus comprising a set of flexible picker fingers movable in one general direction longitudinally of and against the body of a fowl placed within their path, a second set of flexible picker fingers movable generally in the opposite direction, means for so moving the two sets of picker fingers, and mechanical conveyor means for moving said body successively through the paths of both sets of flexible picker fingers, and means for revolving said body while subjected to the action of some of said fingers.

4. Fowl picking apparatus comprising a set of flexible picker fingers movable in one general direction longitudinally of and against the body of a fowl placed within their path, means for holding the body of the fowl substantially taut from opposite ends, a second set of flexible picker fingers movable generally in the opposite direction, means for so moving the two sets of picker fingers, and mechanical conveyor means for moving said body successively through the paths of both sets of flexible picker fingers.

5. In a fowl picking apparatus of the character described, a pair of revolvable picker drums each comprising a hub member with a plurality of outwardly extending flexible picker fingers forming a substantially cylindrical brush, means mounting said drums for revolution in position to bring the ends of their fingers adjacent as the drums revolve, means revolving the drums in direction to move their adjacent fingers in the same direction so as to operate against the body of a fowl placed in the path of the fingers between the drums, the axes of said drums arranged in oblique crossing relation so as to tend to revolve the body of the fowl.

6. In a fowl picking apparatus of the character described, a pair of revolvable picker drums each comprising a hub member with a plurality of outwardly extending flexible picker fingers forming a substantially cylindrical brush, means mounting said drums for revolution in position to bring the ends of their fingers adjacent as the drums revolve, means revolving the drums in direction to move their adjacent fingers in the same direction so as to operate against the body of a fowl placed in the path of the fingers between the drums, the axes of said drums arranged in oblique crossing relation so as to tend to revolve the body of the fowl, and means suspending a fowl between said drums with freedom to turn on its axis of suspension.

7. In a structure as set out in claim 6, mechanical conveyor means for moving the suspended fowl substantially longitudinally of the drums through the path of the revolving fingers as the fowl is revolved.

8. In a structure as set out in claim 6, mechanical conveyor means for moving said fowl substantially longitudinally of the drums through the path of the revolving fingers and means for also moving said fowl longitudinally of the fowl and transversely of the drums while in the path of the fingers.

9. Fowl picking apparatus comprising a plurality of pairs of revolvable drums with flexible picking fingers projecting outwardly therefrom in the general manner of a cylindrical brush, the drums of each pair arranged in adjacent relation to bring the paths of their fingers in apposition when rotating so as to operate against opposite sides of a fowl suspended between the drums, means for revolving the drums, said pairs of drums arranged in substantially horizontal endwise spaced relation, a conveyor arranged longitudinally over the drums, spaced means on said conveyor adapted for suspending fowl at intervals in position to be carried along between the pairs of drums in succession, and means below some of the drums arranged and adapted to hold and guide the lower end of the fowl along the path of travel.

10. Fowl picking apparatus comprising a plurality of pairs of revolvable drums with flexible picking fingers projecting outwardly therefrom in the general manner of a cylindrical brush, the drums of each pair arranged in adjacent relation to bring the paths of their fingers in apposition when rotating so as to operate against opposite sides of a fowl suspended between the drums, means for revolving the drums, said pairs of drums arranged in substantially horizontal endwise spaced relation, a conveyor arranged longitudinally over the drums, spaced means on said conveyor adapted for suspending fowl at intervals by their feet in position to be carried along between the pairs of drums in succession, and means below some of the drums arranged and adapted to hold and guide the head end of the fowl along the path of travel.

11. In a structure as set out in claim 9, one pair of drums between which the fowls pass being revolved to move the fingers in one direction against the suspended fowls, and the next pair revolved in the opposite direction.

12. In a structure as set out in claim 9, one pair of drums between which the fowls pass being revolved to move the fingers in one direction against the suspended fowls, and the next pair being revolved in the opposite direction and with their axes set in oblique crossing relation so as to cause their fingers to exert a revolving action on the fowl suspended between them around their longitudinal axes.

13. In a structure as set out in claim 9, there being three pairs of the drums, the second pair revolving in opposite direction to the first pair, and means for moving the fowl longitudinally of its body between one of the pairs of drums transversely thereof as the fowl is carried along on said conveyor.

14. In a fowl picking apparatus of the character described, a movable carrier with flexible resilient picking fingers projecting therefrom, said fingers each comprising an elongated body of soft rubber-like material, the body being substantially oblong in cross section with a relatively thin rib or fin projecting from opposite edges and with a series of openings in the central portion of the body spaced along the same.

15. In a fowl picking machine, a pair of revolvable drums substantially horizontally disposed and each provided with flexible picking fingers projecting outwardly therefrom in the general manner of a cylindrical brush and with the drums close enough for the fingers to engage opposite sides of a fowl suspended between the drums, and mechanical conveyor means for so suspending a fowl and moving it through the picking zone comprising means engaging the fowl adjacent the feet with head hanging down, and conveyor means also engaging the fowl adjacent the head to hold the fowl down against being lifted bodily when the picking fingers are moved upwardly against the fowl, said fowl between its upper and lower engaged ends being freely exposed on all sides to the unhindered action of said picking fingers.

16. The method of defeathering fowl which comprises mechanically presenting the body of a fowl to the action of a plurality of flexible picking fingers moving in a general direction longitudinally over opposite sides of the fowl, while mechanically holding the fowl from opposite ends only adjacent its feet and head and with the fowl freely exposed at all sides to the unhindered action of said fingers, and advancing the thus held fowl along a predetermined path through the operating zone of said fingers.

ANDREW J. TOTI.
PETER PRINCEVALLE.

REFERENCES CITED

The following references are of record in the file of this patent:

UNITED STATES PATENTS

| Number | Name | Date |
| --- | --- | --- |
| 1,217,393 | Berg | Feb. 27, 1917 |
| 1,889,228 | Swanson | Nov. 29, 1932 |
| 2,035,948 | Devout | Mar. 31, 1936 |
| 2,235,619 | McMahan et al. | Mar. 18, 1941 |
| 2,389,404 | Barker | Nov. 20, 1945 |
| 2,412,338 | Jasper | Dec. 10, 1946 |
| 2,422,608 | Albright | June 17, 1947 |